United States Patent
Watterodt et al.

(10) Patent No.: US 10,054,238 B2
(45) Date of Patent: Aug. 21, 2018

(54) BIDIRECTIONAL KNIFE GATE VALVE WITH A PERIMETER SEAT

(71) Applicant: DeZURIK, Inc., Sartell, MN (US)

(72) Inventors: Sidney Watterodt, Cambridge (CA); Robert A. Blenkush, Sartell, MN (US)

(73) Assignee: DeZURIK, Inc., Sartell, MN (US)

( * ) Notice: Subject to any disclaimer, the term of this patent is extended or adjusted under 35 U.S.C. 154(b) by 78 days.

(21) Appl. No.: 14/857,493

(22) Filed: Sep. 17, 2015

(65) Prior Publication Data

US 2016/0076657 A1   Mar. 17, 2016

Related U.S. Application Data

(60) Provisional application No. 62/051,714, filed on Sep. 17, 2014.

(51) Int. Cl.
   *F16K 27/04*   (2006.01)
   *F16K 3/02*   (2006.01)
   *F16K 25/00*   (2006.01)

(52) U.S. Cl.
   CPC .......... *F16K 25/005* (2013.01); *F16K 3/0227* (2013.01); *F16K 3/0281* (2013.01); *F16K 27/044* (2013.01)

(58) Field of Classification Search
   CPC .... F16K 25/005; F16K 27/044; F16K 3/0281; F16K 3/0227
   USPC .................................................. 251/326, 328
   See application file for complete search history.

(56) References Cited

U.S. PATENT DOCUMENTS

| | | | | |
|---|---|---|---|---|
| 1,801,237 | A | * | 4/1931 | Hanson .................. F16K 3/0281 138/94.3 |
| 2,669,416 | A | * | 2/1954 | Hilton ..................... F16K 3/316 251/156 |
| 3,081,674 | A | | 3/1963 | Steen |
| 3,412,972 | A | | 11/1968 | Williams et al. |

(Continued)

FOREIGN PATENT DOCUMENTS

| | | | | |
|---|---|---|---|---|
| DE | 1957560 A1 | * | 5/1971 | ........... F16K 3/0281 |
| DE | 3009983 A1 | * | 9/1981 | ........... F16K 3/0281 |

(Continued)

OTHER PUBLICATIONS

"International Search Report & Written Opinion," for PCT/US2015/050743 dated Dec. 18, 2015 (9 pages).

(Continued)

*Primary Examiner* — Marina Tietjen
(74) *Attorney, Agent, or Firm* — Pauly, DeVries Smith & Deffner LLC

(57) ABSTRACT

Embodiments of the invention include a knife gate valve. The knife gate valve can include: a valve body that defines a center aperture, the valve body configured to be coupled to a conduit; a gate disposed at least partially within the valve body, the gate configured to move vertically in relation to the valve body; a seat disposed in a portion of the valve body, the seat comprising a first end and a second end; and a packing area disposed within the valve body, wherein the packing area comprises a packing element is disposed around a portion of the gate; wherein the first end of the seat and the second end of the seat terminate within the valve body between a middle of the center aperture and the packing area. Other embodiments are also included herein.

17 Claims, 16 Drawing Sheets

(56) References Cited

U.S. PATENT DOCUMENTS

| | | | |
|---|---|---|---|
| 4,206,905 A * | 6/1980 | Dobler | F16K 3/0263 |
| | | | 251/328 |
| 4,522,224 A | 6/1985 | Sidler et al. | |
| 4,623,122 A | 11/1986 | Gambetta et al. | |
| 4,679,770 A * | 7/1987 | Liberman | F16K 3/0281 |
| | | | 251/328 |
| 4,773,627 A * | 9/1988 | King | F16K 3/0281 |
| | | | 251/328 |
| 4,881,719 A | 11/1989 | Bowman et al. | |
| 5,154,397 A | 10/1992 | Flippo et al. | |
| 5,653,423 A | 8/1997 | Young et al. | |
| 5,836,570 A | 11/1998 | Blenkush | |
| 7,350,766 B2 | 4/2008 | Comstock et al. | |
| 7,815,170 B2 | 10/2010 | Devine, Jr. et al. | |
| 7,946,556 B1 * | 5/2011 | Trott | F16J 15/104 |
| | | | 251/175 |
| 2005/0218368 A1 * | 10/2005 | Vanderberg | F16K 3/0281 |
| | | | 251/327 |

FOREIGN PATENT DOCUMENTS

| | | | | |
|---|---|---|---|---|
| GB | 2340916 A * | 3/2000 | | F16K 3/0227 |
| WO | WO 02095273 A1 * | 11/2002 | | F16K 3/0227 |

OTHER PUBLICATIONS

Libke, A. "Bi-Directional Knife Gate Valves," A Competitive Comparison, Mar. 2011 (1 page).

International Preliminary Report on Patentability for PCT Application No. PCT/US2015/050743 dated Mar. 30, 2017 (7 pages).

* cited by examiner

BIDIRECTIONAL KNIFE GATE VALVE WITH A PERIMETER SEAT

CLAIM OF PRIORITY

This application claims the benefit of U.S. Provisional Application No. 62/051,714, filed Sep. 17, 2014, the content of which is herein incorporated by reference in its entirety.

FIELD OF THE INVENTION

The present invention relates to bidirectional knife gate valve. More specifically, the present invention relates to bidirectional knife gate valve with a perimeter seat.

BACKGROUND OF THE INVENTION

Knife gate valves are often used as isolation or shut-off valves. A knife gate valve is often intended to shut-off flow without regard to the direction of flow or the direction in which pressure is applied relative to the valve.

Most knife gate valves include a seat. The seat usually goes through a packing area or chamber at the top of the valve body. The point where the packing in the packing chamber, the seat and the gate intersect can create a leak path. The leak path is frequently overcome by significant compression of the packing The significant compression of the packing can lead to very high thrust loads during operation of the gate.

Accordingly, there is a need for a knife gate valve that requires less force to terminate leaks.

SUMMARY OF THE INVENTION

Embodiments of the invention include a knife gate valve, that includes a valve body that defines a center aperture, the valve body configured to be coupled to a conduit; a gate disposed at least partially within the valve body, the gate configured to move vertically in relation to the valve body; a seat disposed in a portion of the valve body, the seat comprising a first end and a second end; and a packing area disposed within the valve body, wherein the packing area comprises a packing element is disposed around a portion of the gate; wherein the first end of the seat and the second end of the seat terminate within the valve body between a middle of the center aperture and the packing area.

In an embodiment, the first end of the seat and the second end of the seat terminate adjacent to the packing area.

In an embodiment, the first end of the seat and the second end of the seat terminate on opposite sides of the gate.

In an embodiment, the first end of the seat and the second end of the seat terminate above the center aperture.

In an embodiment, the seat comprises a first end cap on the first end and a second end cap on the second end.

In an embodiment, the seat comprises a metal reinforcement member.

In an embodiment, the packing element encircles a portion of the gate.

Embodiments of the invention include a seat for use in a knife gate valve, that include a first end; a second end opposite the first end; an inner surface extending at least partially between the first end and the second end, wherein the inner surface comprises a non-linear surface and one or more ribs extending along the inner surface in a direction from the first end to the second end; an outer surface extending at least partially between the first end and the second end, wherein the outer surface comprises a non-linear surface and an outer surface rib extending along the outer surface in a direction from the first end to the second end.

In an embodiment, the outer surface defines a relief on either side of the outer surface rib.

In an embodiment, the seat further includes a metal reinforcement member disposed within the seat.

In an embodiment, the seat further includes a first end cap disposed on the first end, and a second end cap disposed on the second end.

Embodiments of the invention include a knife gate valve, that includes a valve body that defines a center aperture, the valve body configured to be coupled to a conduit; a gate disposed at least partially within the valve body, the gate configured to move vertically in relation to the valve body from an open position to a closed position, and from a closed position to an open position, and a seat disposed in a portion of the valve body, the seat comprising a first end and a second end; wherein the gate comprises an non-linear outer surface configured to match with the seat; wherein the seat comprises an inner surface extending at least partially between the first end and the second end, wherein the inner surface comprises a non-linear surface configured to match with the non-linear outer surface of the gate.

In an embodiment, the seat comprises an inner surface extending at least partially between the first end and the second end, wherein the inner surface comprises a non-linear surface and one or more ribs extending along the inner surface in a direction from the first end to the second end.

In an embodiment, the seat comprises an outer surface extending at least partially between the first end and the second end, wherein the outer surface comprises a non-linear surface and an outer surface rib extending along the outer surface in a direction from the first end to the second end.

In an embodiment, the outer surface defines a relief on either side of the outer surface rib.

In an embodiment, when the gate is in a closed position the outer surface and the valve body define a void on each side of the outer surface rib.

In an embodiment, the seat comprises a metal reinforcement member.

In an embodiment the knife gate valve further includes a first end cap disposed on the first end, and a second end cap disposed on the second end.

In an embodiment, the seat comprises at least one non-linear section and two linear sections.

In an embodiment, the seat comprises at least two different cross-sections.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope of the present invention is defined by the appended claims and their legal equivalents.

BRIEF DESCRIPTION OF THE FIGURES

The invention may be more completely understood in connection with the following drawings, in which.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION OF THE INVENTION

The embodiments of the present invention described herein are not intended to be exhaustive or to limit the invention to the precise forms disclosed in the following detailed description. Rather, the embodiments are chosen and described so that others skilled in the art can appreciate and understand the principles and practices of the present invention.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

Figure 1:
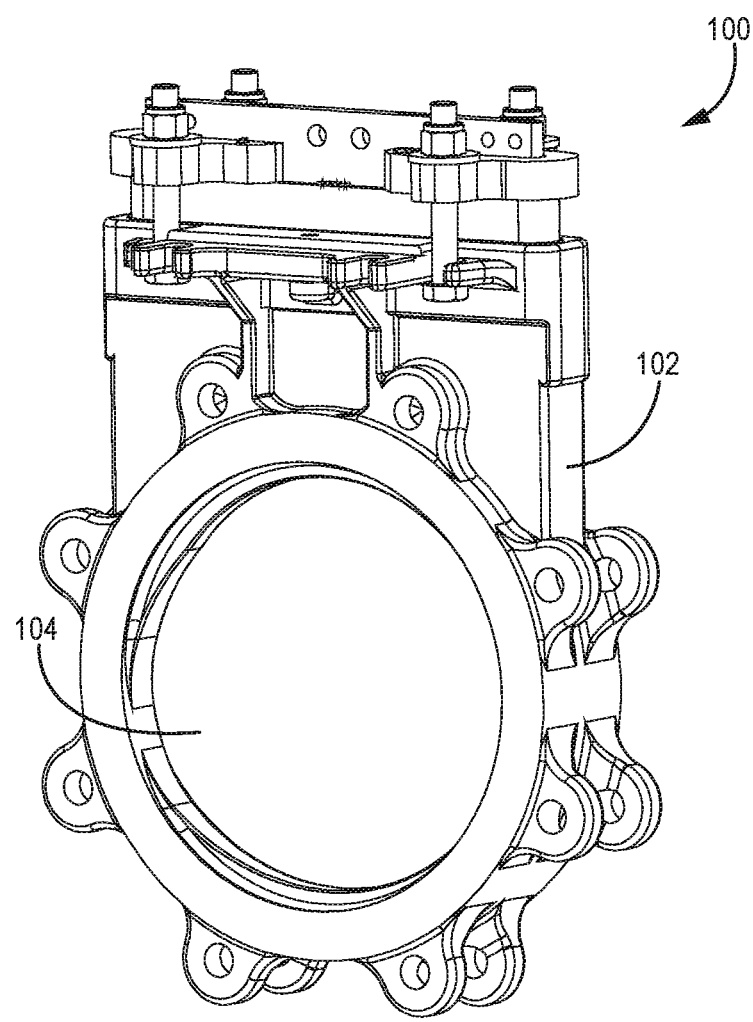
FIG. 1 is a perspective view of a knife gate valve with the gate in a closed position, according to an embodiment.

FIG. 1 shows a perspective view of a knife gate valve 100, according to an embodiment. The knife gate valve 100 can be bidirectional, such that flow through the valve can be in either direction. The knife gate valve 100 can include a valve body 102, such as the body of the valve that additional components can be coupled to. The valve body 102 can define a center aperture (shown in FIG. 2) configured to allow the passage of fluids through the valve 100.

The knife gate valve 100 can include a gate 104, such as substantially planar element that can be moved along a vertical axis with respect to the valve body 102. The gate 104 can be moved vertically with respect to the body 102, such as to open of close the center aperture. The gate 104 can be disposed at least partially within the body. In an embodiment, more of the gate 104 is disposed within the body 102 when the gate 104 is in a closed position compared to the gate 104 being in an open position. The valve body 102 can be configured to be coupled to a conduit or a pipe, such as to accommodate flow through the pipe and the valve 100 when the gate 104 is in an open position, or to substantially terminate flow through the pipe with the gate 104 is in a close position.

Figure 2:
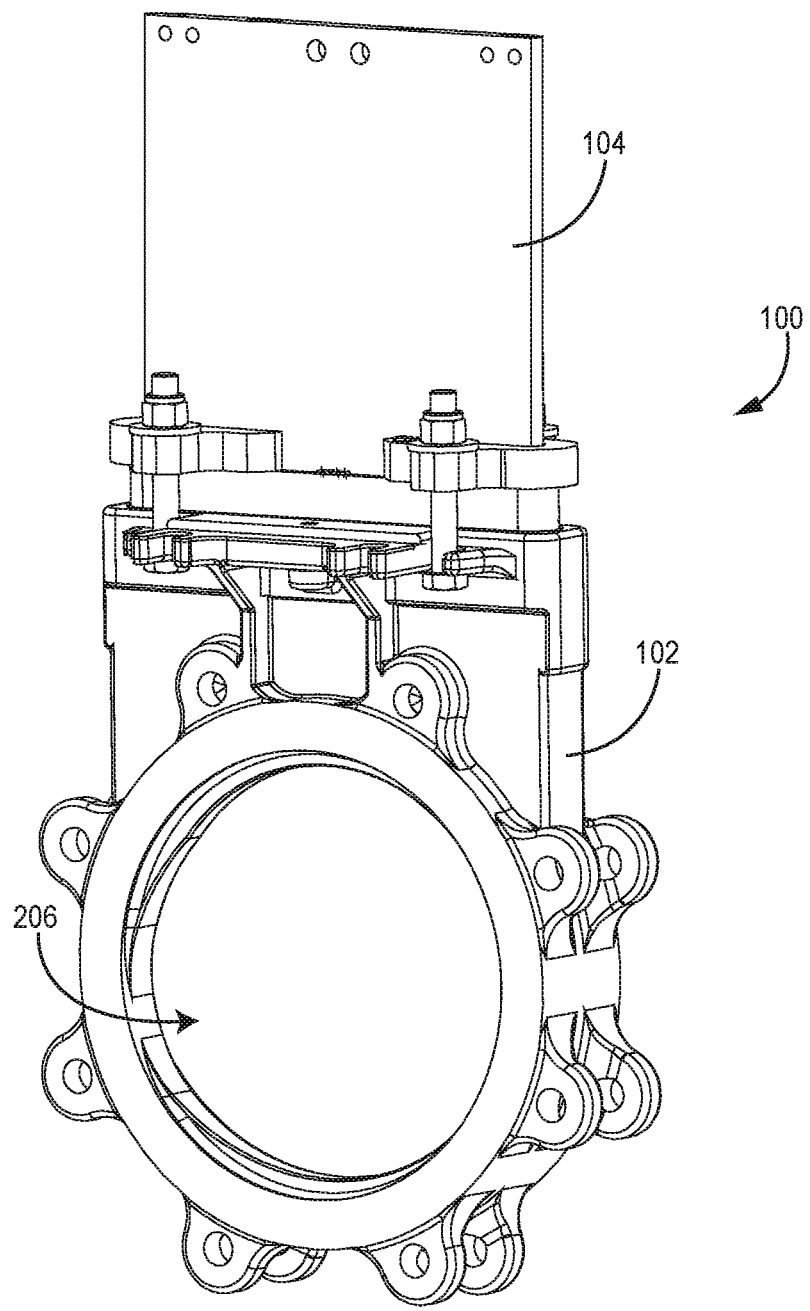
FIG. 2 is a perspective view of a knife gate valve with the gate in an open position, according to an embodiment.

FIG. 2 shows a perspective view of a knife gate valve 100 with the gate 104 in an open position. The valve body 102 can define a center aperture 206. When the gate 104 is in an open position, the gate can be substantially clear of the center aperture 206, such as to allow fluids to flow through the valve 100. When the gate 104 is in a closed position, the gate can substantially block the center aperture 206, such as to substantially terminate the flow of fluids through the valve 100.

Figure 3:
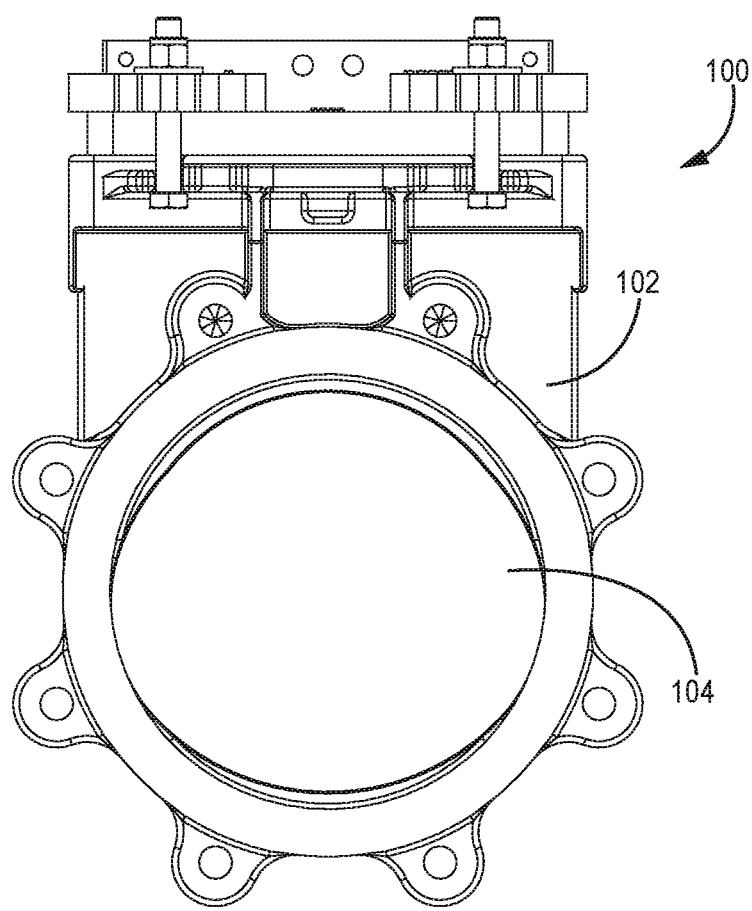
FIG. 3 is a front view of a knife gate valve with the gate in a closed position, according to an embodiment.
Figure 4:
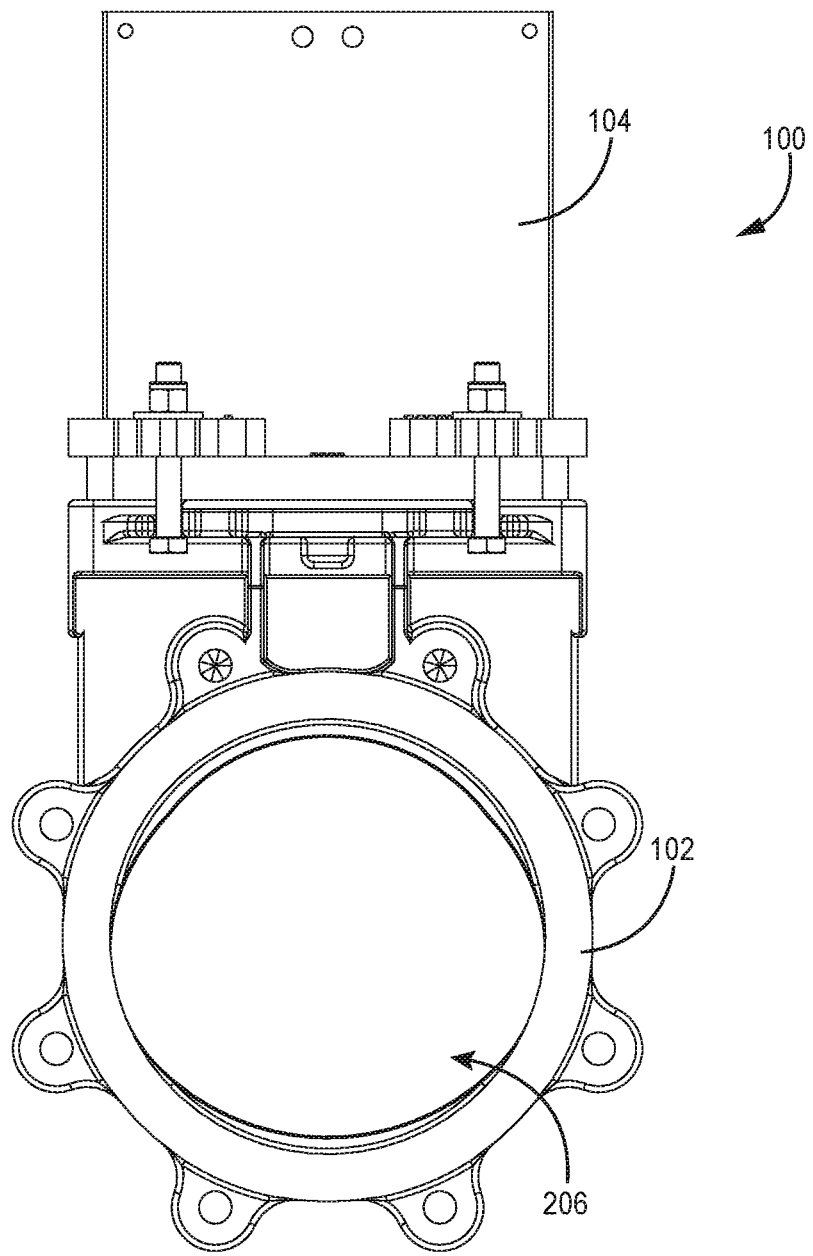
FIG. 4 is a front view of a knife gate valve with the gate in an open position, according to an embodiment.

FIG. 3 shows a front view of the valve 100, with the gate 104 in the closed position (similar to FIG. 1). FIG. 4 shows the valve 100 of FIG. 3, with the gate 104 in the open position (similar to FIG. 2).

Figure 5:
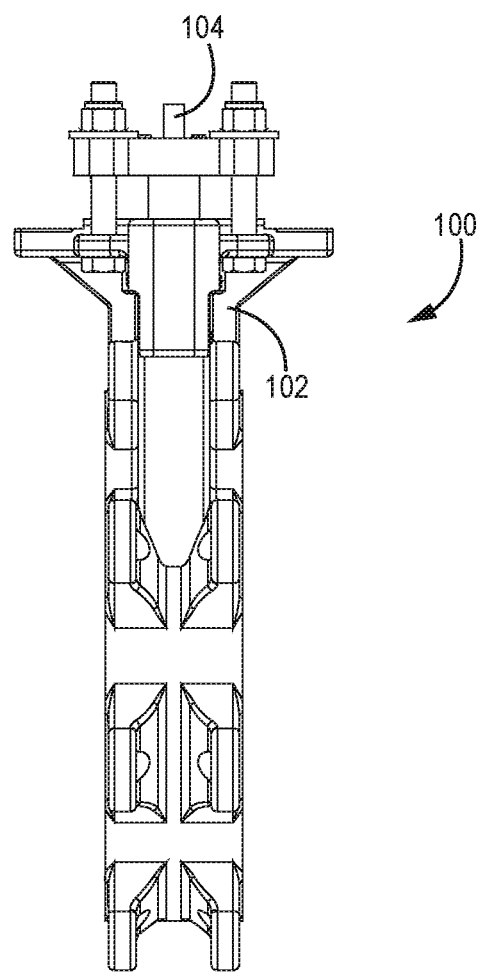
FIG. 5 is a side view of a knife gate valve with the gate in a closed position, according to an embodiment.
Figure 6:
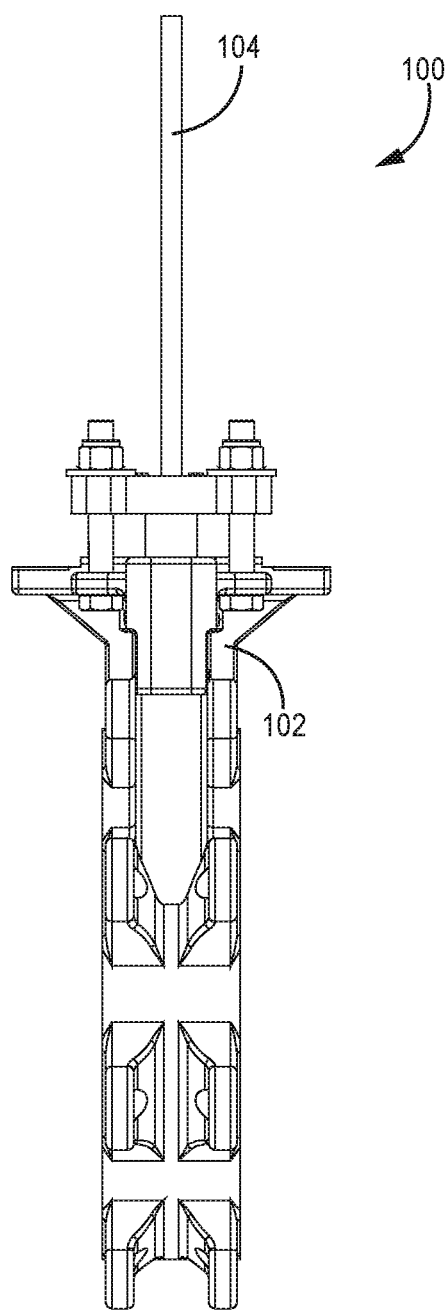
FIG. 6 is a side view of a knife gate valve with the gate in an open position, according to an embodiment.

FIG. 5 shows a side view of the valve 100, with the gate 104 in the closed position (similar to FIG. 1 and FIG. 3). FIG. 6 shows the valve 100 of FIG. 3, with the gate 104 in the open position (similar to FIG. 2 and FIG. 4).

Figure 7:
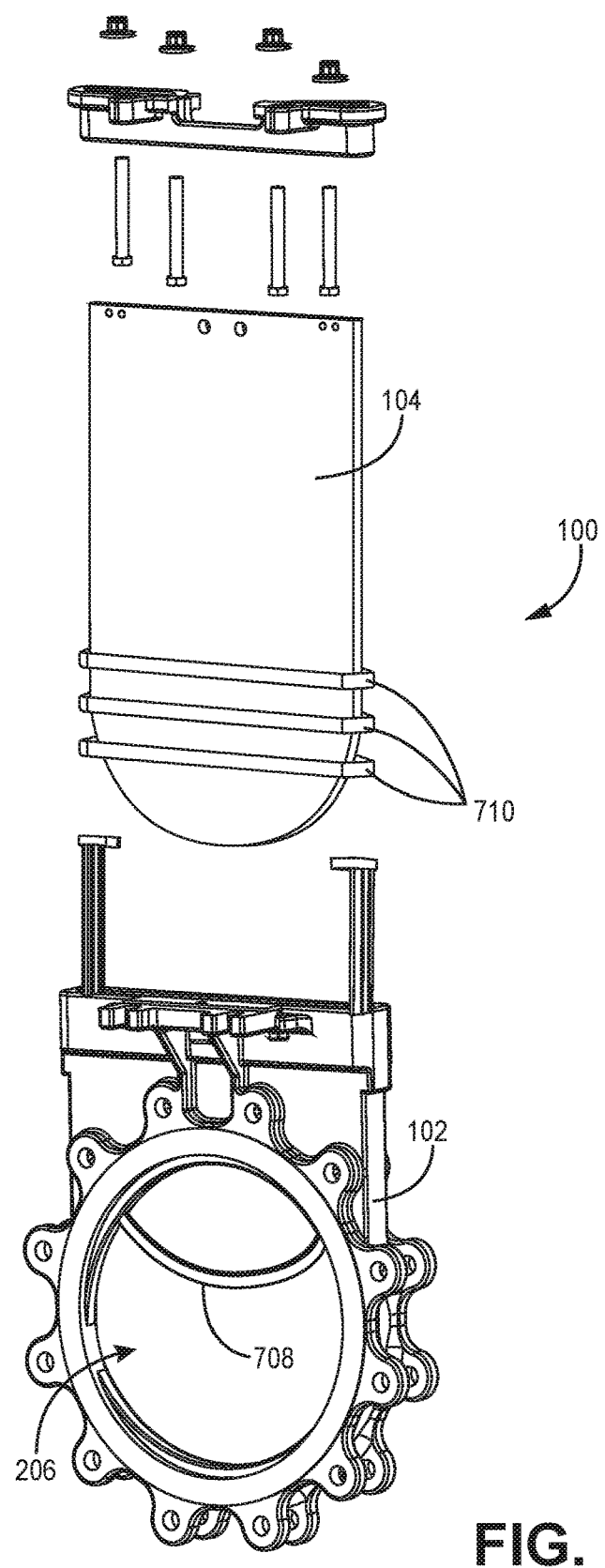
FIG. 7 is an exploded view of a knife gate valve, according to an embodiment.

FIG. 7 shows an exploded view of a knife gate valve 100, according to an embodiment. The valve 100 can include a seat 708, such as a sealing device that extends around at least a perimeter of the center aperture 206. The seat 708 can include rubber or a polymer. The seat 708 can be configured to aid in terminating the flow through the center aperture 206 when the gate 104 is in the closed position. The seat 708 can help seal or terminate the flow around the edges of the gate 104, such as between the edge of the gate 104 and the body 102. When the gate 104 is in the closed position, there can be a small void between the gate 104 and the body 102 in which fluid can leak through the valve 100. The seat 708 can occupy at least a portion of the void, such as to further aid in terminating the flow through the valve 100. The seat 708 can provide bidirectional sealing, such that the seat can provide a seal for flow in either direction through the valve.

Figure 13:
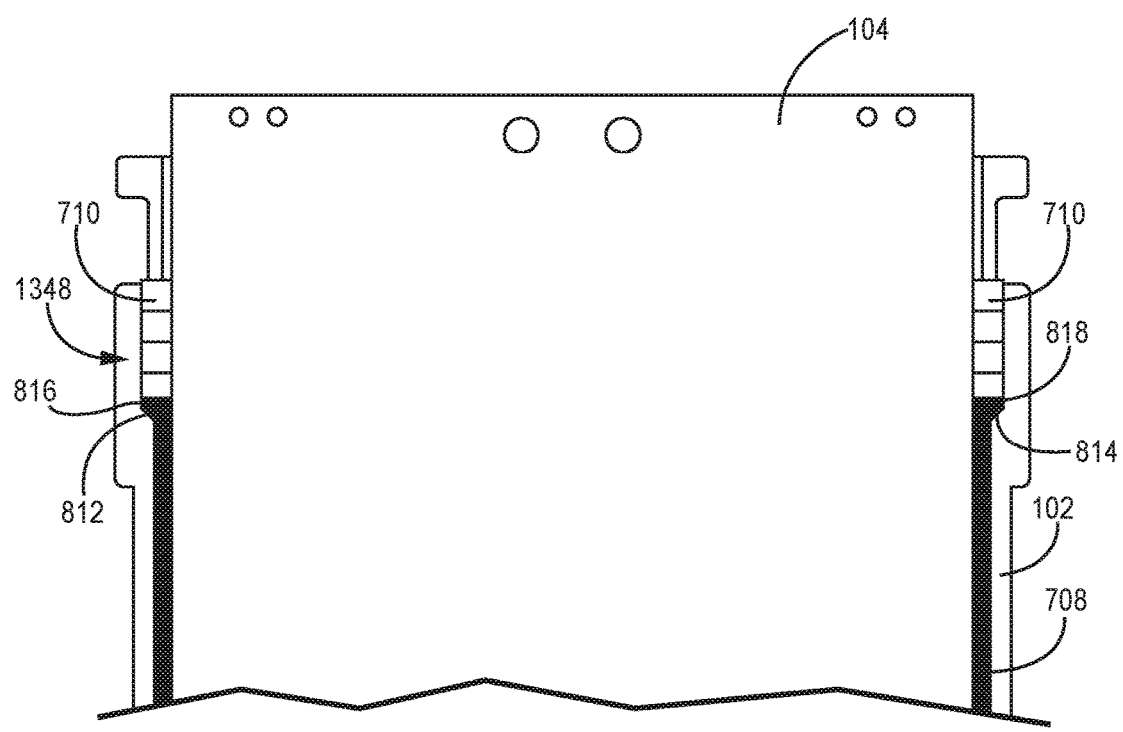
FIG. 13 is a front cross-section view of a portion of a knife gate valve, according to an embodiment.

The valve 100 can include a packing area (shown in FIG. 13). The packing area can include a packing element 710. The packing element 710 can be compressed around a portion of the gate 104, such as to provide a seal around the gate 104 in order to prevent fluid leaking through the valve 100. The packing element 710 can be stationary with respect to the body 102, as the gate 104 goes from an open position to a closed position, or from a closed position to and open position. In an embodiment, there can be three packing elements 710 disposed within the body 102 and around at least a portion of the gate 104. In an embodiment, the three packing elements 710 can be substantially parallel with each other as they encircle the gate 104. In alternative embodiments, there can be one packing element, two packing elements, four packing elements, or five packing elements. Other amounts of packing elements are also possible.

Figure 8:
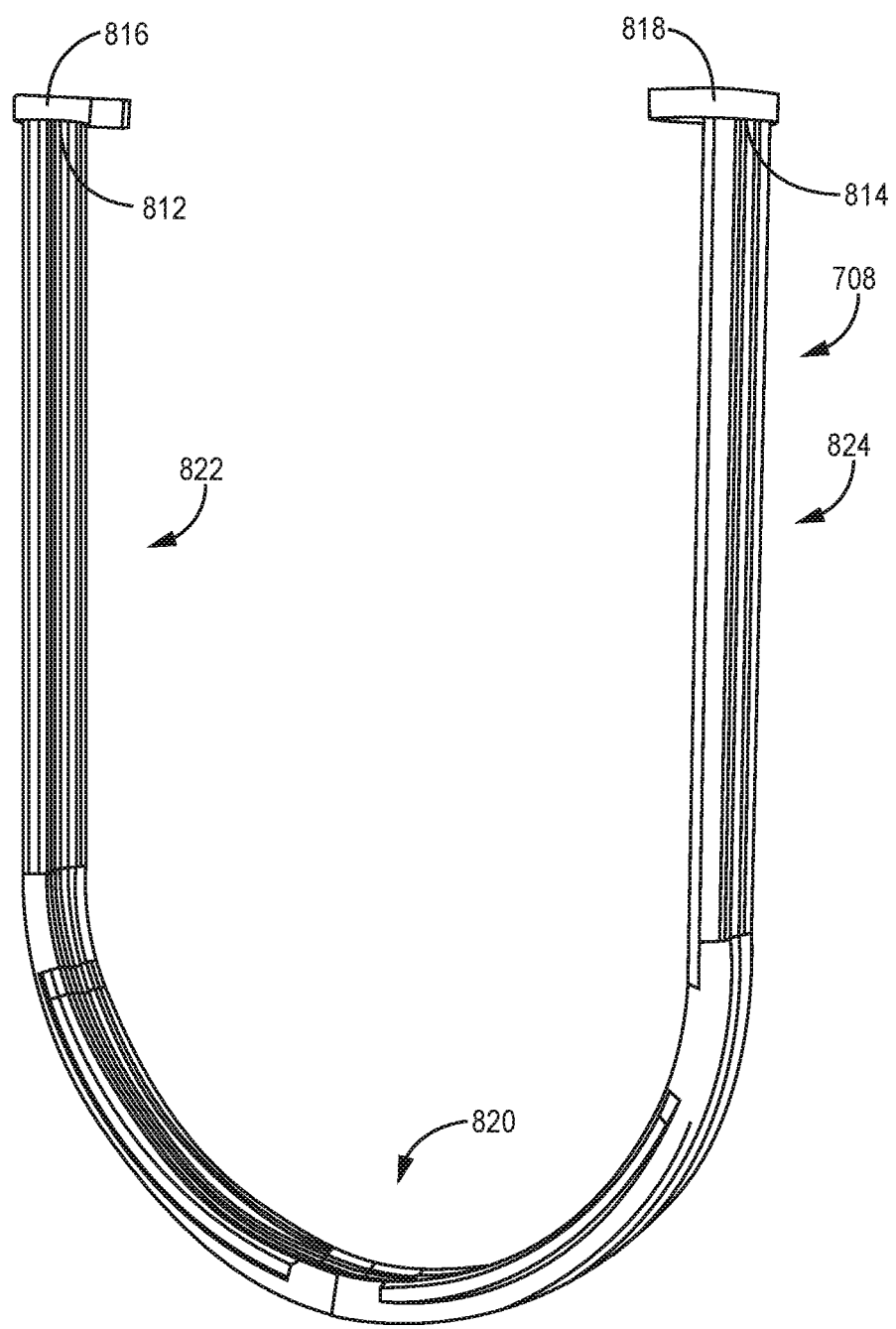
FIG. 8 is a perspective view of a seat, according to an embodiment.
Figure 14:
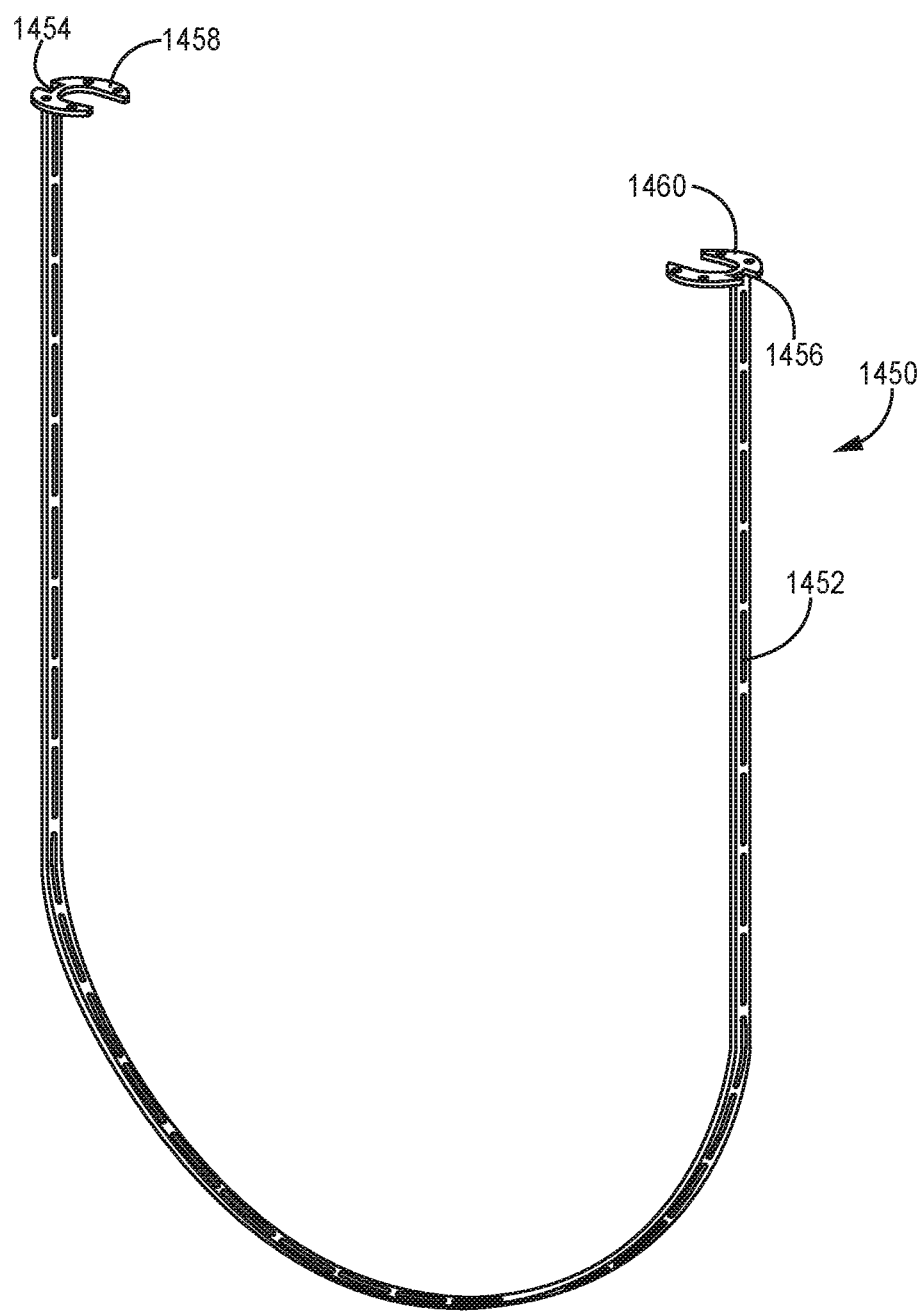
FIG. 14 is a perspective view of a reinforcement member, according to an embodiment.
Figure 15:
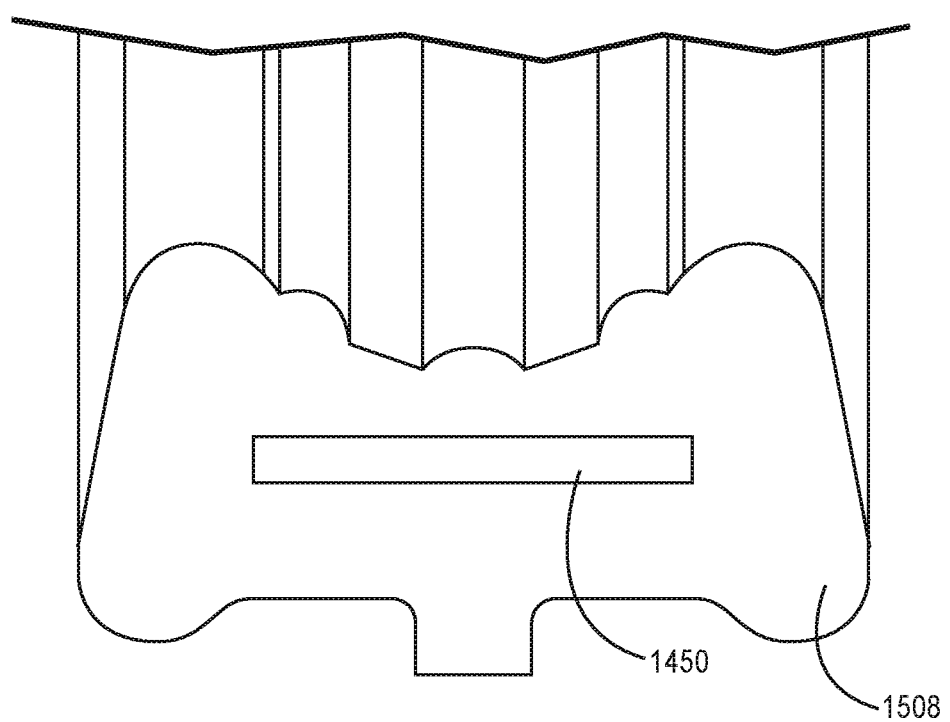
FIG. 15 is a close up of a cross-section view of a portion of a seat with a reinforcement member, according to an embodiment.
Figure 16:
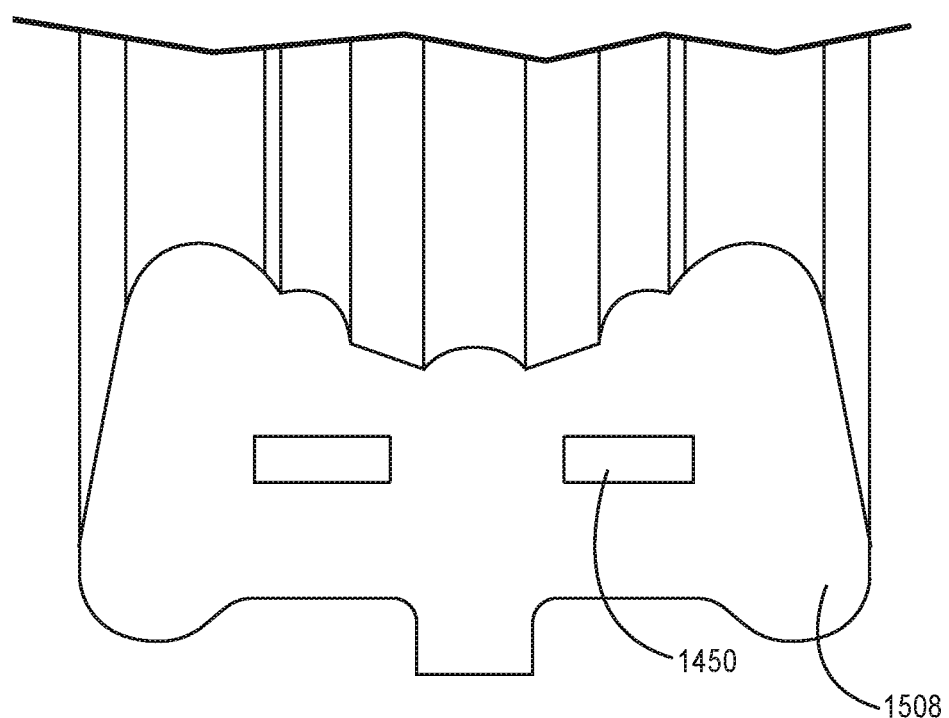
FIG. 16 is a close up of a cross-section view of a portion of a seat with a reinforcement member, according to an embodiment.

FIG. 8 shows a perspective view of a seat 708, according to an embodiment. The seat 708 can be substantially "U" shaped. The seat 708 can include a polymer or rubber. In an embodiment, the seat 708 can include a reinforcement member (as shown in FIGS. 14-16), such as a metal reinforcement member. The reinforcement member can include metal, such as a metal wire. The reinforcement member can be disposed within the seat 708. The reinforcement member can reinforce the seat 708, such as to increase the seat's 708 rigidity or stiffness. In an embodiment the reinforcement member can be disposed in the vertical or linear portions of the seat 708. In an embodiment, the seat 708 includes two reinforcement members, such as one in each of the vertical or linear portions of the seat 708.

The seat 708 can include a first end 812 and a second end 814. The first end 812 can be on the opposite end of the seat 708 from the second end 814. There can be a first end cap 816 disposed on the first end 812. There can be a second end cap 818 disposed on the second. The end caps 816, 818 can have a larger cross section than the first end 812 and the second end 814, such as shown in FIG. 8. The end caps 816, 818 can provide a contact area with the packing element 710.

The seat 708 can include a non-linear section 820. The seat can include a first linear section 822 and a second linear section 824. In an embodiment, the non-linear section 820 can be disposed between the first linear section 822 and the second linear section 824. In an embodiment, the non-linear section 820 can have a different cross-section shape than the linear section 822, 824. In an embodiment, the linear sections 822, 824 can include a reinforcement member.

Figure 9:
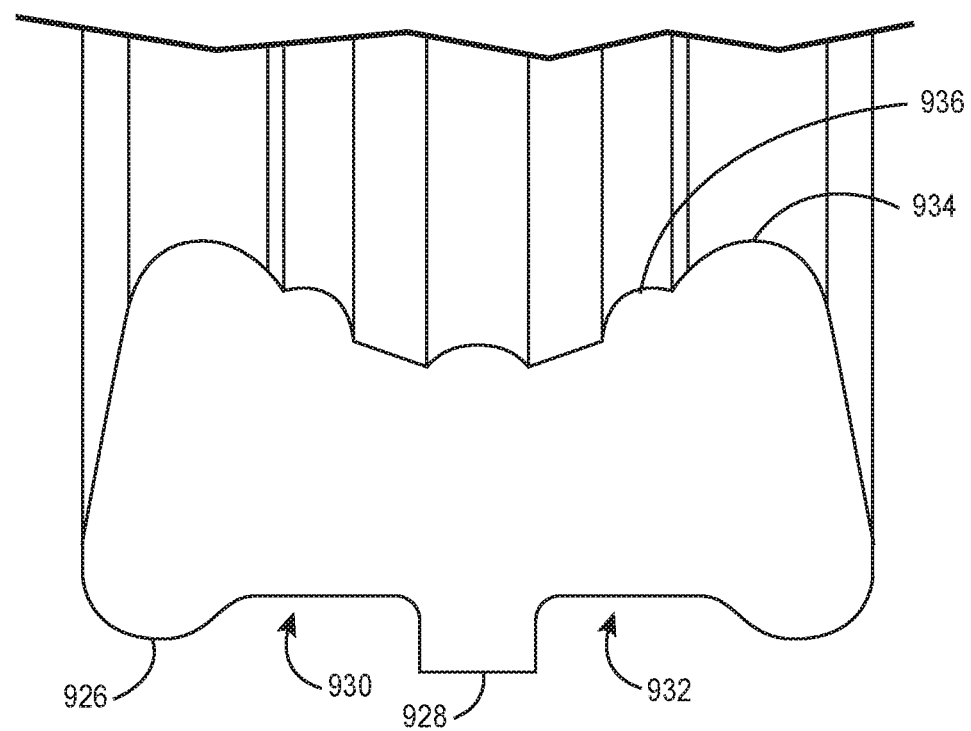
FIG. 9 is a close up of a cross-section view of a portion of a seat, according to an embodiment.

FIG. 9 shows a close up of a cross-section view of a seat 708, such as a cross-section of the non-linear section 820. The seat 708 can include an outer surface 926, such as a surface that contacts the valve body 102. The outer surface 926 can include a rib 928, such as a protrusion that extends along the seat 708. The rib 928 can extend in a direction from the first end 812 to the second end 814. In an embodiment, the rib 928 extends from the first end 812 to the second end 814. In an embodiment, the rib 928 extends along only a portion of the seat 708 between the first and second ends 812, 814.

The rib 928 can be configured to contact the valve body 102, such as to provide a seal to stop the flow of fluids between the gate 104 and the valve body 102 when the gate is in the closed position. The rib 928 can be located substantially in the middle of the outer surface 926.

The seat 708 can define a first relief 930 on one side of the rib 928 and a second relief 932 on the opposite side of the rib 928, such as channels that are on either side of the rib 928. In an embodiment, the seat 708 can be compressed (such as by the gate in a closed position) and the rib 928 can become at least temporarily deformed, the reliefs 930, 932 can allow for the rib to have space to deform into, while the rib 928 contacts the valve body 102 to create a seal. In an embodiment, the outer surface 926 can be non-linear, such that it includes a rib 928 and at least two reliefs 930, 932.

The seat 708 can include an inner surface 934. The inner surface 934 can be configured to contact the gate 104, such as when the gate 104 is in a closed position. The inner surface 934 can extend at least partially between the first end 812 and the second end 814. The inner surface 934 can be non-linear, such as curved or arced. The inner surface 934 can include one or more ribs 936, such as protrusions extending from the inner surface 934. The one or more ribs 936 can be configured to contact the gate 104, such as when the gate 104 is in a closed position.

The ribs 936 can extend along the seat 708 at least partially between the first end 812 and the second end 814. The ribs 936 can extend in a direction from the first end 812 to the second end 814.

Figure 10:
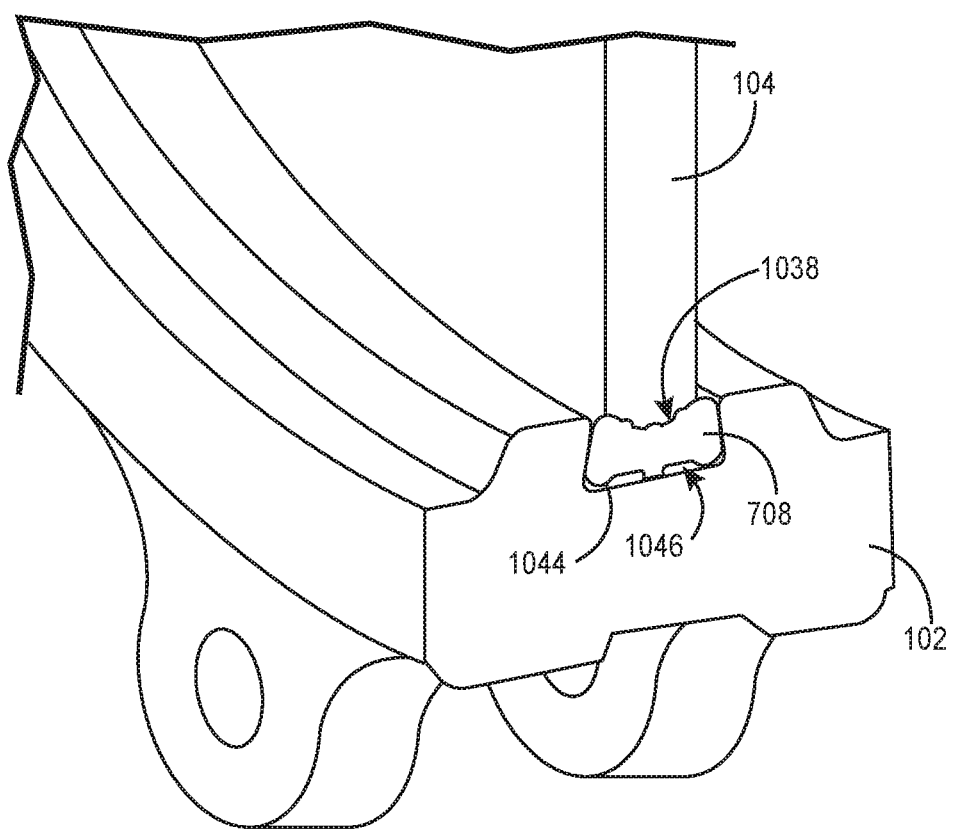
FIG. 10 is a close up of a cross-section view of a portion of a knife gate valve, according to an embodiment.
Figure 11:
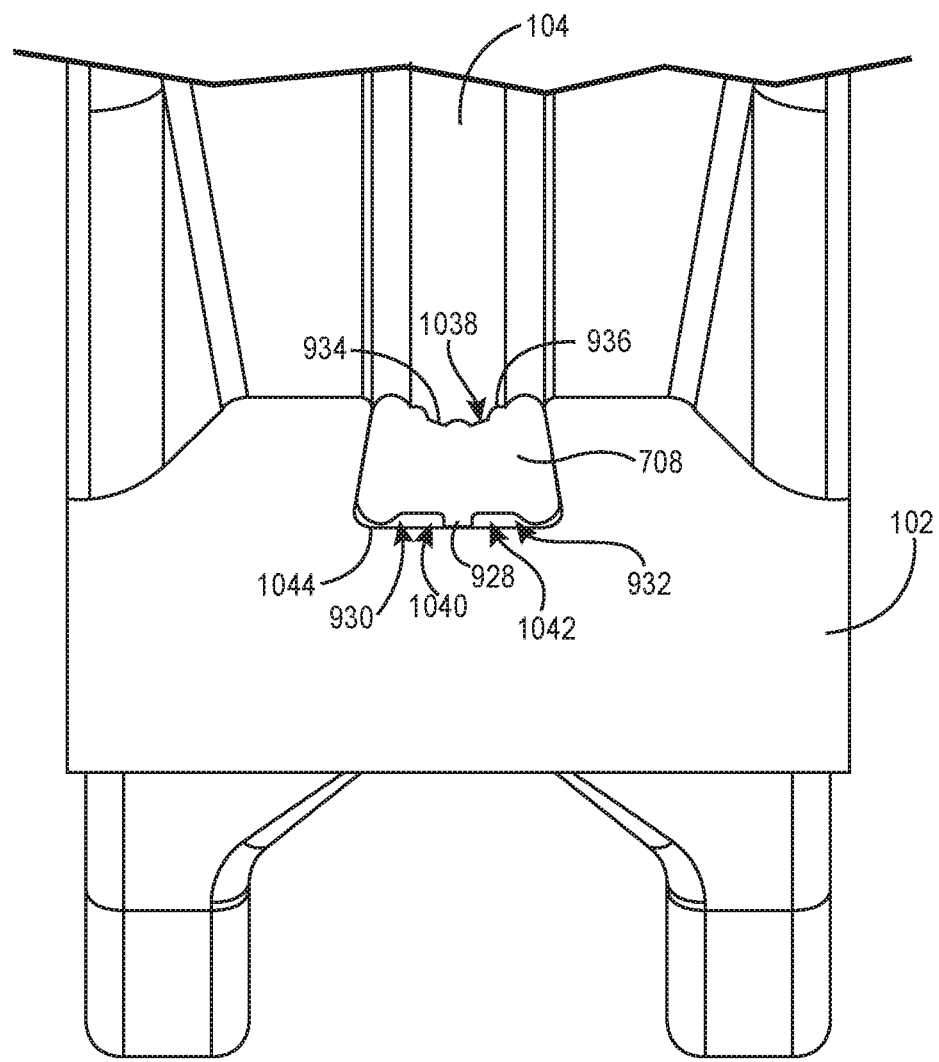
FIG. 11 is a close up of a cross-section view of a knife gate valve with the gate in a closed position, according to an embodiment.

FIG. 10 shows a close up of a cross-section perspective view of a portion of a valve 100 with the gate 104 in a closed position. Similarly, FIG. 11 shows a close up of a cross-section view of a portion of a valve 100 with the gate 104 in a closed position. In an embodiment, the gate 104 can include a non-linear outer surface 1038. The non-linear outer surface 1038 can be curved or arced, such as to match or substantially align with the inner surface 934 of the seat.

Figure 12:
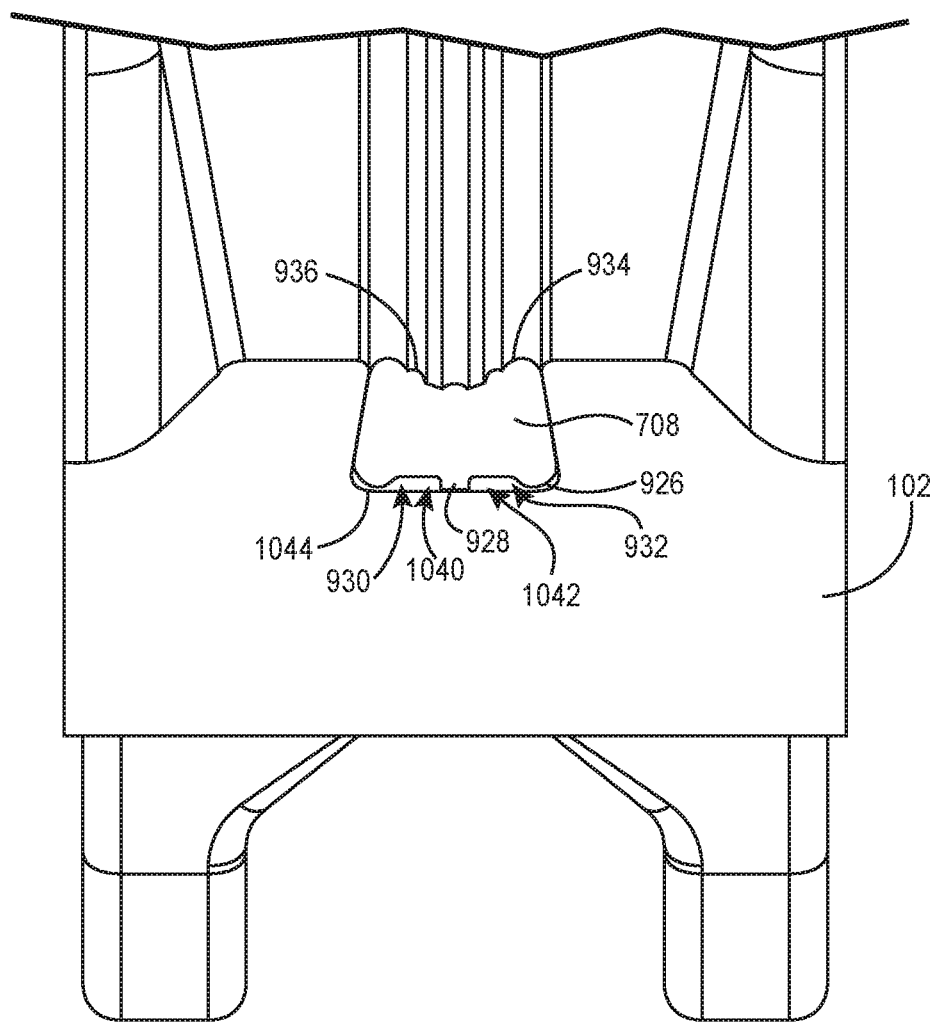
FIG. 12 is a close up of a cross-section view of a knife gate valve with the gate in an open position, according to an embodiment.

In an embodiment, when the gate 104 is in a closed position, the gate 104 can at least partially compress the seat 708, such as to create a seal. In an embodiment, when the seat 708 is compressed, the seat 708 and the body 102 can define one or more void 1040, 1042. The voids 1040, 1042 can be defined at least partially from the presence of the reliefs 930, 932. In an embodiment, the outer seat contacting surface 1044 of the body 102 can include a recess 1046 for accepting the rib 928. In an embodiment, the depth of the recess 1046 can be smaller than the height of the rib 928, such that the portions of the seat defining the reliefs 930, 932 do not contact the outer seat contacting surface 1044, such as to define the voids 1040, 1042. Alternatively, the outer seat contacting surface 1044 can be planar or linear, such as shown in FIG. 11. FIG. 12 shows a similar view to FIG. 11; however, in FIG. 12 the gate 104 is in an open position.

FIG. 13 shows a front cross-section view of a portion of a knife gate valve, with the gate 104 in a closed position, according to an embodiment. The valve 100 can include a packing area 1348. The packing area 1348 can include one or more packing elements 710. The packing area 1348 can extend around or encircle a portion of the gate 104 when the gate 104 is in a closed position. The packing element 710 can be compressed or compacted into the packing area 1348 to create a seal between the gate 104 and the body 102 when the gate 104 is in a closed position.

In an embodiment, the packing area 1348 is located within the body 102 and above the top of the center aperture 206. In an embodiment, the first end 812 and the second end 814 terminate within the body 102 at some point between the middle of the center aperture 206 and the packing area 1348. In an embodiment, the first end 812 and the second end 814 terminate within the body 102 at adjacent to the packing area 1348. In an embodiment, the first end 812 and the second end 814 terminate on opposite sides of the gate 104. In an embodiment, the first end 812 and the second end 814 terminate within the body 102 above the top of the center aperture 206.

In an embodiment, the seat 708 can include end caps 816, 818, as described above. The end caps 816, 818 can be disposed adjacent to the packing area 1348, such that the packing area 1348 contact a top portion of the end caps 816, 818. The packing elements 710 can contact the end caps 816, 818, such that the packing elements 710 aid in keeping the seat 708 in its intended location with respect to the valve body 102 when the gate 104 is moving from an open position to a closed position, or from a closed position to an open position.

FIG. 14 shows a perspective view of a reinforcement member 1450, according to an embodiment. As discussed above, the seat can include a reinforcement member 1450. The reinforcement member 1450 can be within the polymer or rubber of the seat, such that in various embodiments the reinforcement member 1450 is completely enclosed within the seat. A reinforcement member 1450 can be completely enclosed within the seat, such that no portions of the reinforcement member 1450 are exposed.

The reinforcement member 1450 can be generally "U" Shaped, such as shown in FIG. 14. The reinforcement member 1450 can define a plurality of apertures 1452. The apertures 1452 can be generally oval shaped. In various other embodiments, the apertures 1452 can be rectangular or circular.

The reinforcement member 1450 can include a first end 1454 and a second end 1456. The first end 1454 can include a first end cap 1458. The second end 1456 can include a second end cap 1460. The first and second end caps 1458, 1460 can have a larger cross-section that the first end 1454 and the second end 1456. In various embodiments, the first end cap 1458 can be enclosed within the first cap 816 of the seat (shown in FIG. 8) and the second end cap 1460 can be enclosed within the second end cap 818 of the seat. The end caps 1458, 1460 can define one or more holes for coupling the reinforcement member 1450 or seat to the valve body or the packing area.

FIG. 15 shows a close up of a cross-section view of a portion of a seat 1508 with a reinforcement member 1450 enclosed within, according to an embodiment. FIG. 16 shows a close up of a cross-section view of a portion of a seat 1508 with a reinforcement member 1450, according to an embodiment. FIG. 15 shows the cross-section of the seat 1508 and reinforcement member 1450 along a portion of the reinforcement member 1450 that does not define an aperture 1452. FIG. 16 shows the cross-section of the seat 1508 and reinforcement member 1450 along a portion of the reinforcement member 1450 that does define an aperture 1452. In various embodiments, the apertures 1452 defined by the reinforcement member 1450 can be filled or occupied by a portion of the seat 1508.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention has been described with reference to various specific and preferred embodiments and techniques. However, it should be understood that many variations and modifications may be made while remaining within the spirit and scope of the invention.

The invention claimed is:

1. A knife gate valve, comprising:
   a valve body that defines a center aperture, the valve body configured to be coupled to a conduit;
   a gate disposed at least partially within the valve body, the gate configured to move vertically in relation to the valve body;
   a seat disposed in a portion of the valve body, the seat comprising a first end and a second end; and
   a packing area disposed within the valve body, wherein the packing area comprises a packing element disposed around a portion of the gate;
   wherein the first end of the seat and the second end of the seat terminate within the valve body between a middle of the center aperture and the packing area;
   an outer surface extending at least partially between the first end and the second end, wherein the outer surface comprises a rib extending along the center of the outer surface,
   wherein the seat comprises a first end cap on the first end and a second end cap on the second end; and
   wherein the first end cap and the second end cap are disposed adjacent to the packing element.

2. The knife gate valve of claim 1, wherein the first end of the seat and the second end of the seat terminate adjacent to the packing area.

3. The knife gate valve of claim 1, wherein the first end of the seat and the second end of the seat terminate on opposite sides of the gate.

4. The knife gate valve of claim 1, wherein the first end of the seat and the second end of the seat terminate above the center aperture.

5. The knife gate valve of claim 1, wherein the seat comprises a metal reinforcement member.

6. The knife gate valve of claim 1, wherein the packing element encircles a portion of the gate.

7. A seat for use in a knife gate valve having a gate and a packing element encircling at least a portion of the gate, the seat comprising:
   a first end having a first end cap, the first end cap having a top portion contacting the packing element;
   a second end opposite the first end, the second end having a second end cap, the second end cap having a top portion contacting the packing element;
   an inner surface facing the gate extending at least partially between the first end and the second end, wherein the inner surface comprises a non-linear surface and one or more ribs extending along the inner surface in a direction from the first end to the second end;
   an outer surface facing away from the gate extending at least partially between the first end and the second end, wherein the outer surface comprises a non-linear surface and an outer surface rib extending along the outer surface in a direction from the first end to the second end;
   the outer surface rib extending along the center of the outer surface.

8. The seat for use in a knife gate valve of claim 7, wherein the outer surface defines a relief on either side of the outer surface rib.

9. The seat for use in a knife gate valve of claim 7, further comprising a metal reinforcement member disposed within the seat.

10. A knife gate valve, comprising:
    a valve body that defines a center aperture, the valve body configured to be coupled to a conduit;
    a gate disposed at least partially within the valve body, the gate configured to move vertically in relation to the valve body from an open position to a closed position, and from a closed position to an open position;
    a seat disposed in a portion of the valve body, the seat comprising a first end having a first end cap and a second end having a second end cap;
    a packing element disposed adjacent to the first end cap and the second end cap;

wherein the gate comprises an non-linear outer surface configured to match with the seat;

wherein the seat comprises an inner surface facing toward the gate extending at least partially between the first end and the second end, wherein the inner surface comprises a non-linear surface configured to match with the non-linear outer surface of the gate.

11. The knife gate valve of claim 10, wherein the inner surface comprises a non-linear surface and one or more ribs extending along the inner surface in a direction from the first end to the second end.

12. The knife gate valve of claim 10, wherein the seat comprises an outer surface facing away from the gate extending at least partially between the first end and the second end, wherein the outer surface comprises a non-linear surface and an outer surface rib extending along the outer surface in a direction from the first end to the second end.

13. The knife gate valve of claim 12, wherein the outer surface defines a relief on either side of the outer surface rib.

14. The knife gate valve of claim 12, wherein when the gate is in a closed position the outer surface and the valve body define a void on each side of the outer surface rib.

15. The knife gate valve of claim 10, wherein the seat comprises a metal reinforcement member.

16. The knife gate valve of claim 10, wherein the seat comprises at least one non-linear section and two linear sections.

17. The knife gate valve of claim 10, wherein the seat comprises at least two different cross-sections.

* * * * *